United States Patent
Kramer et al.

(10) Patent No.: US 10,024,995 B2
(45) Date of Patent: Jul. 17, 2018

(54) SYSTEM AND METHOD FOR ELEVATED SOURCE TO BOREHOLE ELECTROMAGNETIC SURVEY

(75) Inventors: Garrett Kramer, El Sobrante, CA (US); Michael Wilt, Abu Dhabi (AE); Edward Nichols, Clamart (FR); Luis DePavia, Orinda, CA (US); H. Frank Morrison, Berkeley, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1456 days.

(21) Appl. No.: 12/696,267

(22) Filed: Jan. 29, 2010

(65) Prior Publication Data
US 2010/0225322 A1 Sep. 9, 2010

Related U.S. Application Data

(60) Provisional application No. 61/148,175, filed on Jan. 29, 2009.

(51) Int. Cl.
*G01V 3/15* (2006.01)
*G01V 3/16* (2006.01)
*G01V 3/30* (2006.01)

(52) U.S. Cl.
CPC ............ *G01V 3/16* (2013.01); *G01V 3/15* (2013.01); *G01V 3/30* (2013.01)

(58) Field of Classification Search
CPC . G01V 3/165; G01V 3/00; G01V 3/02; G01V 3/04; G01V 3/06; G01V 3/08; G01V 3/083; G01V 3/084; G01V 3/085; G01V 3/088; G01V 3/10; G01V 3/12; G01V 3/15; G01V 3/16; G01V 3/17; G01V 3/18; G01V 3/20; G01V 3/22; G01V 3/24; G01V 3/26; G01V 3/28; G01V 3/30
USPC .......................................... 324/339
See application file for complete search history.

(56) References Cited

U.S. PATENT DOCUMENTS

| | | | | |
|---|---|---|---|---|
| 3,959,721 | A | * 5/1976 | Roschuk et al. | 324/359 |
| 4,835,474 | A | * 5/1989 | Parra et al. | 324/363 |
| 5,892,362 | A | * 4/1999 | Warren et al. | 324/339 |
| 5,999,883 | A | * 12/1999 | Gupta et al. | 702/7 |
| 6,369,574 | B1 | * 4/2002 | Ederlov et al. | 324/339 |
| RE40,321 | E | * 5/2008 | Srnka | 324/354 |
| 8,310,239 | B2 | 11/2012 | Zhang et al. | |
| 8,332,191 | B2 | 12/2012 | Rosthal et al. | |

(Continued)

OTHER PUBLICATIONS

Kong, F.N. et al., Casing Effects in the Sea-to-Borehole Electromagnetic Method, Geophysics, vol. 74, No. 5, pp. F77-F87.

(Continued)

*Primary Examiner* — David Schindler
(74) *Attorney, Agent, or Firm* — Michael Dae

(57) ABSTRACT

Methods and systems are provided to determine a property of an earth formation, comprising a mobile transmitter disposed at a predetermined elevated height above a surface of the earth formation, and one or more receivers moveably disposed in a wellbore penetrating the earth formation. Electromagnetic energy is transmitted from the mobile transmitter into the formation from a plurality of locations; and at the one or more receivers a signal is measured. Using the signal received by the one or more receivers, a property of the formation, such as resistivity, can be determined and mapped.

18 Claims, 6 Drawing Sheets

(56) References Cited

U.S. PATENT DOCUMENTS

| | | | |
|---|---|---|---|
| 8,400,159 B2 | 3/2013 | Gao et al. | |
| 8,614,578 B2 | 12/2013 | Gao et al. | |
| 8,638,103 B2 | 1/2014 | Rosthal et al. | |
| 9,377,556 B2 | 6/2016 | Alumbaugh et al. | |
| 2005/0001622 A1* | 1/2005 | Morrison et al. | 324/330 |
| 2006/0091888 A1* | 5/2006 | Holman et al. | 324/326 |
| 2006/0261815 A1* | 11/2006 | Martin | 324/330 |
| 2007/0288211 A1* | 12/2007 | MacGregor et al. | 703/5 |
| 2009/0005993 A1* | 1/2009 | Abubakar et al. | 702/7 |
| 2009/0039889 A1* | 2/2009 | Wilt et al. | 324/338 |
| 2009/0302850 A1* | 12/2009 | Lopez et al. | 324/337 |

OTHER PUBLICATIONS

Spies and Habashy, Sensitivity Analysis of Crosswell Electromagnetics, Geophysics, vol. 60, No. 3, May-Jun. 1995, p. 834-845.
Alumbaugh and Morrison, Theoretical and Practical considerations for crosswell electromagnetic tomography assuming a cylindrical geometry, Geophysics, vol. 60, No. 3, May-Jun. 1995, p. 846-870.
Ward, S. H., and Hohmann, G.W., Electromagnetic theory for geophysical applications; Chapter 4, in Electromagnetic methods in applied geophysics (vol. 1), edited by Nabighian M. N., Investigations in Geophysics, SEG, Tulsa, OK, 1988 (Chapter 4) (200 pages).
Dyck, A., 1991, "Drill-Hole Electromagnetic Methods", pp. 881-931, in Electromagnetic Methods in Applied Geophysics, Society of Exploration Geophysicists (50 pages).

* cited by examiner

SYSTEM AND METHOD FOR ELEVATED SOURCE TO BOREHOLE ELECTROMAGNETIC SURVEY

TECHNICAL FIELD

The invention relates generally to reservoir formation evaluation and particularly to systems and methods for conducting an airborne or elevated source to borehole electromagnetic deep-image survey of a reservoir in a formation.

BACKGROUND

In the oil industry, electromagnetic (EM) induction surveys are used to map the electrical conductivity of geologic formations between boreholes and/or radially away from a single wellbore. The latter, usually referred to as induction logging, has been in routine use for over fifty years. Those surveys are performed in open holes; that is, holes that have not been lined with a (typically, metal) casing.

Recently, the concepts of induction logging have been extended to surveys between uncased wells and between wells cased with conductive liners. There is also interest in the use of logging between surface and downhole sensors, and within single wells that are cased with conductive liners.

Airborne electromagnetic surveying and surface based EM surveying are each individually known in the field of geophysics. Such airborne EM survey and surface based EM survey configurations are well described in "Transient and Frequency Electromagnetics" by Kaufman, in "Electromagnetic Methods in Geophysics" by Hohmann et al, 1991.

Airborne EM surveys to date have been limited to geometries and surveys to explore for metallic ores or mapping near surface conditions, such as environmental problems, and the limitations of airborne EM sources in the prior art have prevented success in applications for wellbore receiver technology for subsurface formation imaging of a hydrocarbon reservoir.

Surface to borehole EM (as well as borehole to surface configuration) surveys have been described in detail in applications commonly owned with the present application, including:

U.S. Patent Application Ser. No. 61/160,056 filed Mar. 13, 2009, entitled "Electromagnetic Detection of Base of Salt While Drilling",
U.S. Patent Application Ser. No. 61/173,246 filed Apr. 28, 2009, entitled "Electromagnetic Detection of Base of Salt While Drilling",
U.S. patent application Ser. No. 12/581,947 filed Oct. 20, 2009 entitled "Detecting Electrical Current in a Magnetic Structure",
U.S. patent application Ser. No. 12/641,944 filed Dec. 18, 2009, entitled "Correction Factors For Electromagnetic Measurements Made through Conductive Material",
U.S. patent application Ser. No. 12/641,898 filed Dec. 18, 2009, entitled "Attenuation of Electromagnetic Signals Passing Through Conductive Material",
U.S. patent application Ser. No. 12/603,053 filed Oct. 21, 2009, entitled "Electromagnetic Logging Between Borehole and Surface",
U.S. patent application Ser. No. 12/405,214 filed Mar. 16, 2009, entitled "Casing Correction in Non-magnetic Casing by the Measurement of the Impedance of a Transmitter or Receiver"

The various types of induction surveys typically share many commonalities. A transmitter, usually a multi-turn coil of wire, carries an alternating current of frequency ω (radians/sec). This creates a time-varying magnetic field in the surrounding formation that in turn, by Faraday's law, induces an electromotive force (emf). This emf drives currents in the formation that are basically proportional to the formation conductivity. Finally, a receiver is positioned either in the same hole as the transmitter, in another hole, or on the surface (land or seafloor), and measures the magnetic field arising from the transmitter and the secondary or induced currents in the formation. Conventional induction logging always uses a combination of multiple receivers and/or multiple transmitters connected in series so as to cancel the mutual signal in air. In general, a theoretical model for a logging system embedded in a formation of arbitrary resistivity is used to match or interpret the received signals. In some applications, the absolute value of the average formation resistivity is not as important as the ability to map variations of resistivity within the formation. To determine this spatial variation of formation resistivity, the surveys typically involve placing the transmitter at multiple locations in the hole and measuring the fields at multiple receiver locations for each transmitter location. In crosshole surveys, this yields a data set similar to those obtained from tomography.

DETAILED DESCRIPTION

Figure 1A:
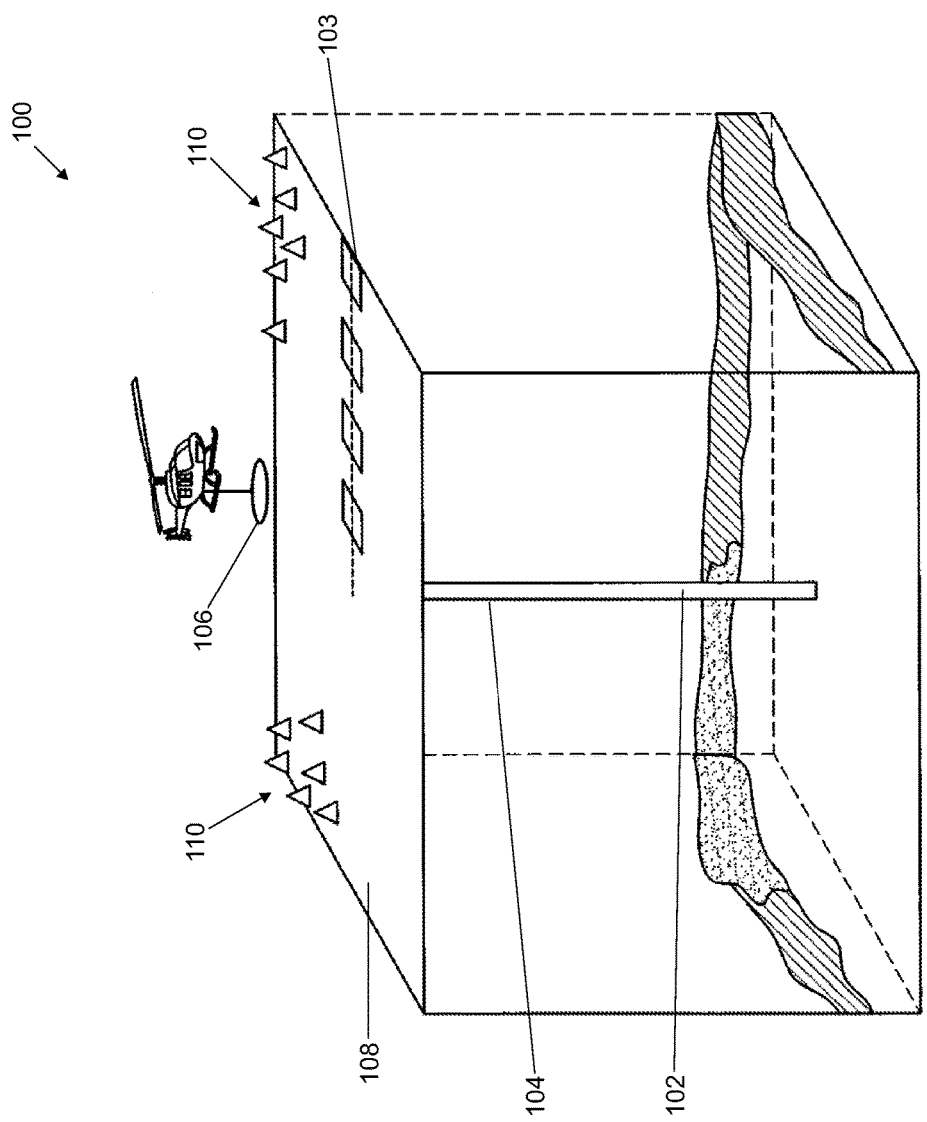
FIG. 1a is a perspective view of a field configuration for an Airborne-to-Borehole EM in accordance with an embodiment of the present invention having a towed airborne source.

In the following description, numerous details are set forth to provide an understanding of the present disclosure. However, it will be understood by those skilled in the art that the present invention may be practiced without these details and that numerous variations or modifications from the described embodiments are possible. The following terms have a specialized meaning in this disclosure. While many are consistent with the meanings that would be attributed to them by a person having ordinary skill in the art, the meanings are also specified here.

This disclosure pertains to a Mobile Elevated Transmitter to Borehole Receiver EM survey geometry in electromagnetics (ATB-EM), where an airborne, or elevated, source is deployed suspended from a helicopter or airplane or other moving platform, such as a truck or rail-mounted transmitter for land applications or towed marine to borehole source. The receiver side of the system is comprised mainly of an array of borehole electromagnetic receivers along with possible surface or airborne electromagnetic receivers. The non-borehole receivers are optional and can be deployed as part of the system, their data would serve in an integrated interpretation of the downhole and surface data, as described in *Removing Effects of Near Surface Geology from Surface-to-Borehole Electromagnetic Data* by Wilt and Kramer, 2008 US patent pending. The ATB-EM data is then inverted for the geological resistivity distribution and formation imaging. Sensitivity studies of the Mobile Elevated Transmitter to Borehole Receiver EM configuration show high sensitivity near both source and receiver positions. One challenge is to focus the measurement on the relatively deep target of interest, the near well formation, while satisfying the sensitivity functions near the transmitter.

The advantages of a Mobile Elevated Transmitter to Borehole Receiver EM system that utilizes an airborne source to collect borehole EM data are that using elevated EM sources will increase the source location density in an efficient manner, making a 3D survey possible, without robbing sensitivity from the measurement, enabled by better discrimination of the near-surface geology.

New generations of airborne electromagnetic systems have demonstrated higher power and versatilities. The free mobility of the source combined with high power allows them to be useful for deep hydrocarbon reservoir imaging that was previously impossible for an airborne electromagnetic (EM) platform.

Sensitivity studies of the Mobile Elevated Transmitter to Borehole Receiver EM (ATB-EM) configuration show high sensitivity near both source and receiver positions. One challenge is to focus the measurement on the target of interest, the near well formation, while satisfying the sensitivity functions near the transmitter.

Considerable advances have been made in developing high power towed marine sources (including those developed and/or manufactured by EMGS, Western Geco/Schlumberger, OHM, and University of Southampton). We have determined that such mobile sources provide EM energy that can be read by electric or magnetic receivers in a borehole. For both the marine or airborne applications, navigation and orientation information is routinely recorded allowing monitoring of the effective source position, moment and direction. The novel application presented here is to combine these sources with borehole measurements. Note that one extension that additionally uses surface or seafloor receivers or other receivers in boreholes would allow greater noise removal by such use as coherency or predictive filtering which could boost the signal-to-noise ratio of the measurements and also allow measurements of gradients or ratios of the fields to be computed. Additionally, variations of our methods for correcting for attenuation caused by the presence of conductive casing in the wellbore may be applied, as described in various patent applications and patents listed above and incorporated herein in their entirety.

The mobile source/transmitter described herein would also encompass the use of a rail mounted or truck mounted transmitter system to achieve the same benefit of mobility of the source.

Referring now to FIG. 1, in the Mobile Elevated Transmitter to Borehole Receiver EM system 100, in concert with an array of receivers 102 deployed in a wellbore 104, an elevated magnetic source transmitter 106 is provided above the ground 108. The elevated magnetic source transmitter 106 broadcasts an EM signal in either time or frequency domain through the earth to be detected by the array of downhole electromagnetic receivers 102 positioned inside the wellbore 104. The objective is to use the EM coupling from the complete array of measurements to perform formation resistivity imaging from the well outwards into the reservoir. The field array is shown schematically in FIG. 1*a*. The transmitter 106 is an elevated highly mobile magnetically coupled loop oriented to generate $B_x$, $B_y$ or/and $B_z$, while receivers sensitive to any combination of $H_x$, $H_y$, $H_z$, $E_x$, $E_y$, or $E_z$ fields and are deployed in a borehole array 102, as well as an optional surface receiver array 110 and/or an optional elevated receiver (not shown in FIG. 1A, but co-located with transmitter 106).

A survey is made by placing receivers in an array 102 (and optionally in an array on the surface 110 and/or at some elevated location) covering the depths of interest for a range of well-transmitter offsets. The depth of investigation range varies for each problem, but a data profile is typically several hundred meters long with stations spaced every few meters above, within, and below the depth range of interest.

In known Surface-to-Borehole configurations, transmitters (shown in FIG. 1A as 103) are usually aligned in a profile emanating from the well in a particular direction, often perpendicular to geologic strike, but can extend multi-azimuthally around a well for 3D geometries. In the configuration for the present disclosure, by comparison, a large increase in the number of source transmitter positions in distance, azimuth, and height above a datum from a well can efficiently be acquired, allowing 3D survey acquisition.

The movement path of the elevated mobile source transmitter 106 could follow any number of designs such as multi-azimuthal walk-away lines or a spiral, in addition to multiple heights. Model and sensitivity studies suggest that a full profile, i.e. from the surface to the reservoir, is not required for effective reservoir imaging. The sensitivity is greatest near the source transmitter and receiver positions but relatively weak in the intervening section, meaning that a good background model will normally account for the response of the intervening formation.

At each location for the elevated mobile source transmitter 106, the system 100 broadcasts a waveform and the receivers (in arrays 102, and optionally 110 and elevated locations) measure this signal synchronously using a GPS clock to maintain the phase reference. Enough data is collected for sufficient signal to noise ratio (SNR), and then the receivers 102 (and optionally surface receivers 110 and/or elevated receivers) are repositioned and the data collection begins anew by repositioning the transmitter 106 to a different location until all desired depth intervals are covered. Field data are typically interpreted by fitting all of the measurements simultaneously to model using a numerical 2D or 3D inversion.

Figure 1B:
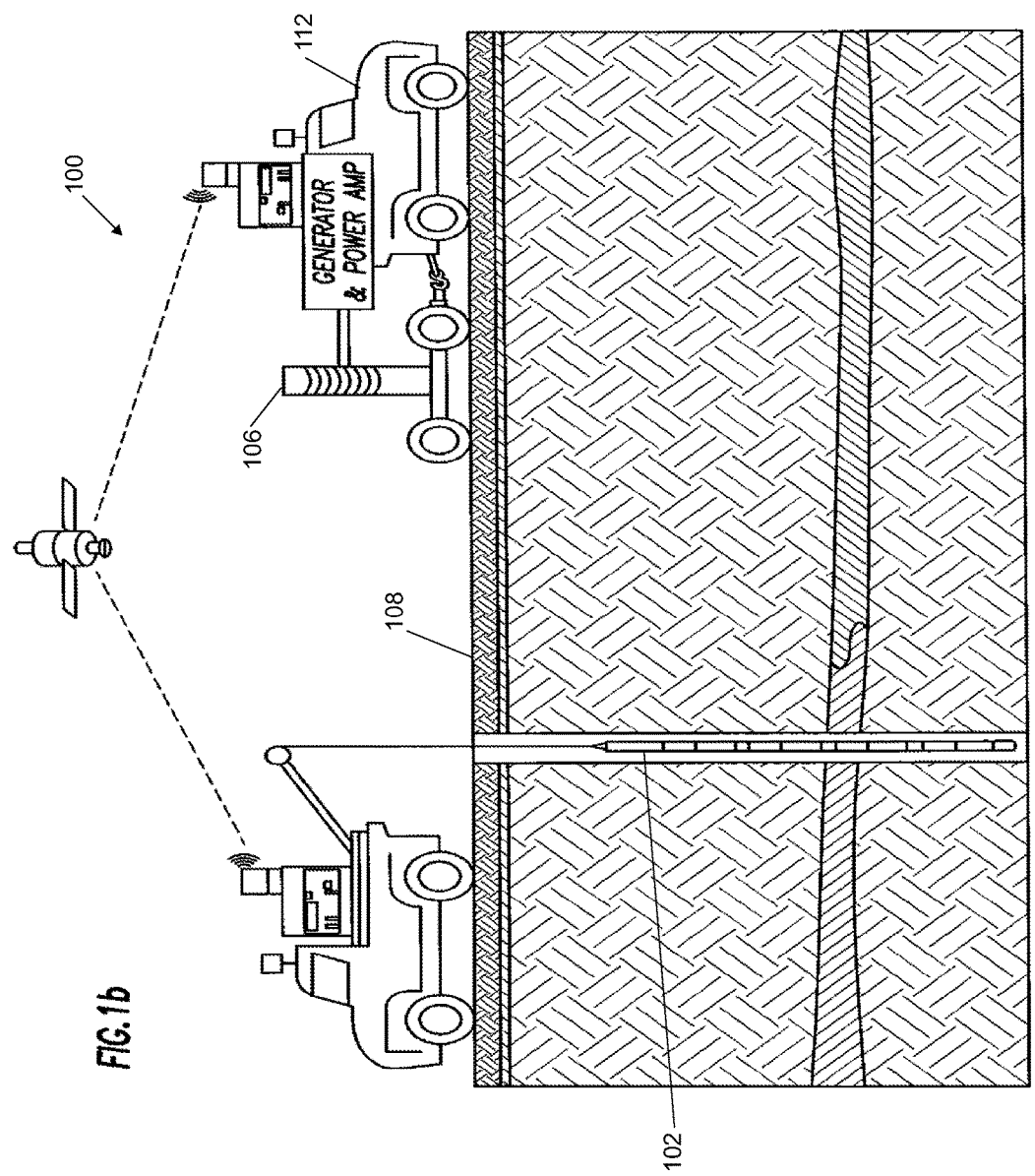
FIG. 1b is a perspective view of a field configuration for an Airborne-to-Borehole EM in accordance with another embodiment of the present invention having a towed elevated source mounted to a vehicle.

The mobile elevated source transmitter 106 could alternatively be a magnetically coupled loop oriented to generate $B_x$, $B_y$ and/or $B_z$ on a platform with wheels and towed by a truck, railcar, or other mobile surface vehicle 112 (as shown by FIG. 1*b*) or a moving marine source (such as the towed electric dipole transmitters developed by Western Geco EM, EMGS or OHM) where the transmitter position, orientation and source waveform are continuously monitored during the survey.

Sensitivity studies of a prior art Surface-to-Borehole array show high sensitivity near both source and receiver positions. Whereas a high sensitivity is desired in the borehole deployed receiver array, such sensitivity is not useful in the surface deployed transmitter. One challenge is to focus the measurement on the target of interest, the near reservoir formation while satisfying the sensitivity demands for the transmitter. Thus, it is desirable to provide a near surface resistivity distribution that satisfies the transmitter sensitivity without distorting or changing the image near the receiver.

The Frechet derivative described in Spies and Habashy (GEOPHYSICS, VOL. 60, NO. 3, MAY-JUNE 1995, P. 834-845) and Alumbaugh and Morrison (GEOPHYSICS, VOL. 60, NO. 3, MAY-JUNE 1995, P. 846-870) can be employed to analyze the spatial sensitivity. The Frechet derivative is defined as the change in the data measured with a given transmitter-receiver pair, caused by a small change in the conductivity at a given point in space. That is, the Frechet Derivative describes how sensitive the measurement is to the geology at different locations in the media. Mathematically it is defined as:

$$J_{kl} = \partial d_i^j / \partial m_{xyz}.  \quad \text{Eq. 1.}$$

where d is the datum collected with the i'th transmitter j'th receiver, and m refers to the conductivity at position xyz in the region surrounding the wells.

Figure 2:
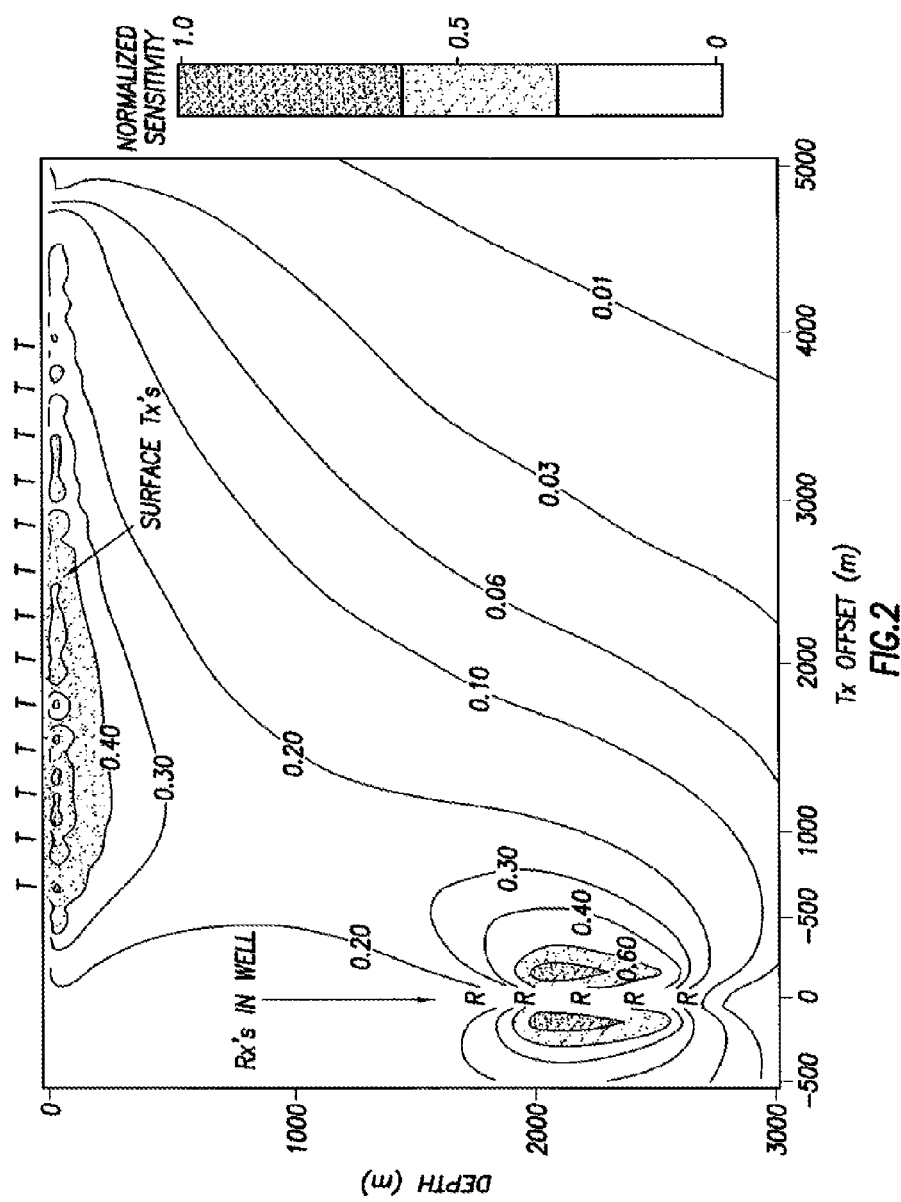
FIG. 2 is a graph of a sensitivity diagram for a surface to borehole configuration over an oil field model showing a high sensitivity near both the sources and receivers but a more muted function on the area between them.

Referring now to FIG. 2, a sensitivity diagram is shown for a surface to borehole configuration over an oil field model. The T's represent surface based transmitters and the R and the borehole receivers. FIG. 2 illustrates the problem of high sensitivity near both the sources and receivers but a more muted function on the area between them. The sensitivity function near the source and receivers can extend for several hundreds of meters from the sensor.

When interpreting these data, the inversion code uses the Frechet function to adjust the model to fit the observed data. For the array described above, the inversion will normally emphasize changing the conductivity near the source and receiver tools to achieve a better data fit, because these areas comprise the highest sensitivity. It is common practice to apply weighting to the Jacobian to add a priori information and to enhance changes in desired regions of the conductivity model.

Figure 3:
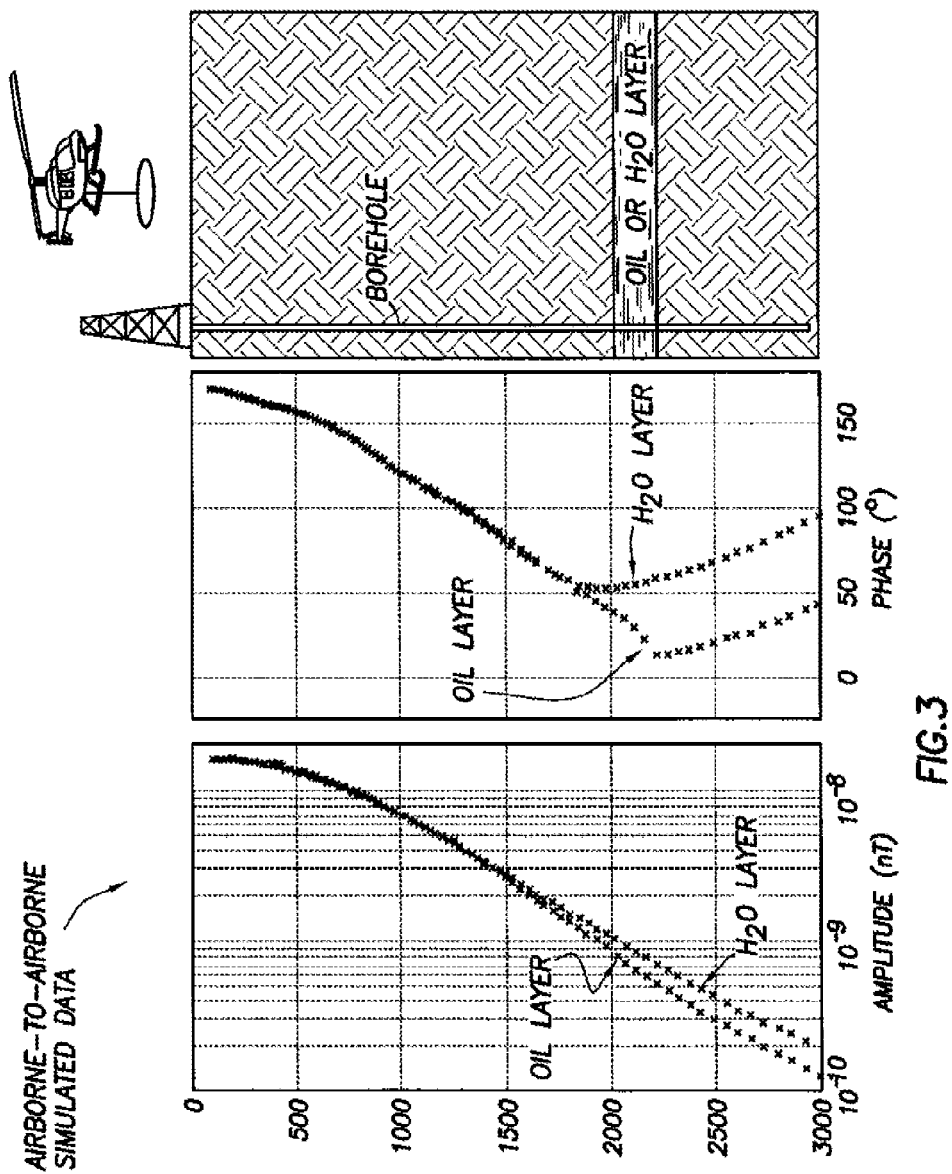
FIG. 3 shows Airborne-to-Borehole simulated data profiles.

In FIG. 3, Elevated Transmitter to Borehole Receiver simulated field profiles comparing the amplitude response from an oil versus water layer at depth with a unit transmitter moment. There are clear changes in amplitude between a $H_2O$-filled reservoir versus an oil filled reservoir. In FIG. 3, a plot of phase profiles is shown of the same data. The plot in FIG. 3 clearly reflects that the measurement is sensitive to the deep subsurface resistivity distribution.

Typical survey data is only collected over a depth range of interest and not all the way to the surface. However, static shifts in these curves can occur effecting the deeper downhole response if the near surface or near transmitter resistivity distribution is variable or discontinuous, introducing error in the deeper interpretation that is highly desirable from an analysis point of view. The addition of surface and elevated/airborne receivers that collect data to discriminate the near surface resistivity structure is possible. The elevated EM transmitter is highly mobile allowing for a very efficient increase in source location density and overcomes the topographical limitations. This makes 3D survey acquisition and interpretation possible around a single well, cased or not. Novel ways of keeping track of the position and power of the source in 3D air space will be an important step in a survey for proper interpretation.

Multiple well surveys can take place simultaneously by outfitting each well with an array downhole EM receivers (and optionally surface receiver arrays and/or elevated receiver arrays). The data from each well will be collected concurrently utilizing the same elevated mobile source, even further increasing survey efficiency. Data collected in this fashion could even be expanded into a virtual crosswell EM survey via virtual source processing methods practiced in the seismic industry.

Figure 4:
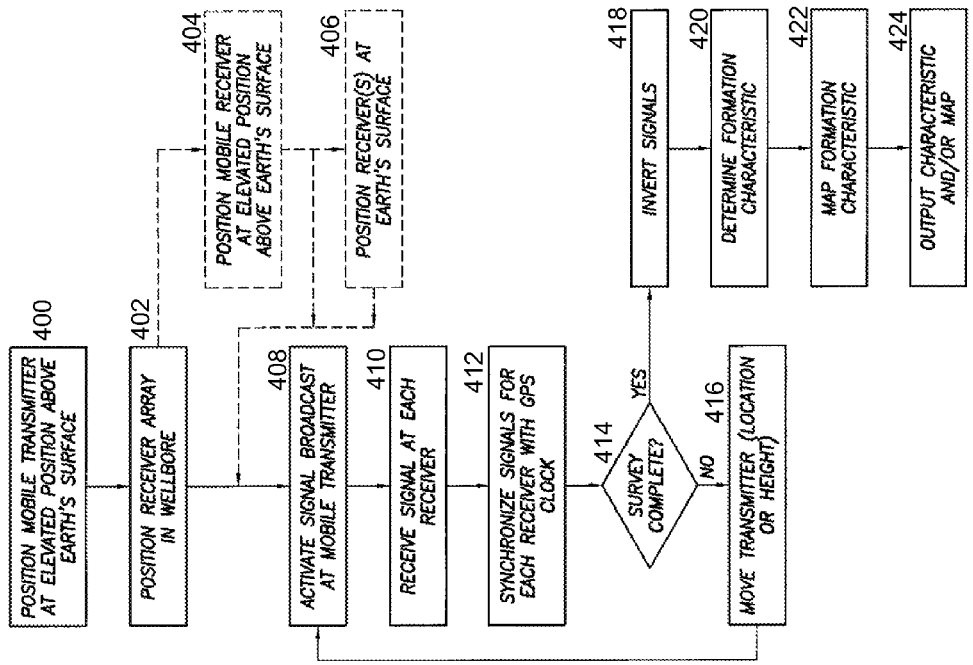
FIG. 4 shows a flowchart for a method for surveying in accordance with embodiments of the present disclosure.

Referring now to FIG. 4, a flowchart for a method for conducting a mobile elevated transmitter to borehole receiver EM survey is provided. In step 400, a mobile transmitter is positioned at an elevated position above the Earth's surface. The elevated position may be at some predetermined height above the Earth's surface that is based a given depth of investigation or a given volume of investigation about the wellbore, and is preferably between 1 and 500 meters in some embodiments. Ideally, the position above the Earth's surface is as close as practicable to the surface as possible, given the limitations of the surface landscape (if there are trees, buildings, etc.) The positioning of the mobile transmitter may be over a land survey area, or in a marine environment, such that the elevated height is some distance above the surface of water over the Earth's surface.

In step 402, a receiver array is positioned in a wellbore, which may be cased or uncased. Optionally, in step 404 one or more mobile receivers may be positioned at an elevated position above the Earth's surface, and optionally, in step 406, one or more receivers may be positioned at the Earth's surface (on land, or one the seabed).

With transmitter and receiver(s) positioned in the various positions described above, in step 408, the high power mobile elevated transmitter is activated to broadcast a signal. The broadcast signal is received at each receiver in the various locations, at step 410. The signal received at each receiver can be synchronized with the signals received at each other receiver using a GPS clock, as is well known (step 412).

If sufficient data has been gathered to generate an analysis of formation characteristics in the depth range of interest (i.e., resistivity in the volume about the wellbore), then at 414, the survey is complete, but if not, the mobile transmitter is moved to a new position (either a new location or a new height) at step 416, and the method repeats back to stop 408, with the mobile transmitter being activated to broadcast the EM signal.

When the survey is complete at 416, then at step 418, the signal measurements are inverted, in accordance with the many inversion techniques that are well known in the art, and some of which are described and/or claimed in the related art listed above, and incorporated by reference in their entirety. From the inversion, a formation characteristic such as resistivity can be determined at step 420, and mapped in step 422. The output of the formation characteristic value and/or map at step 424 may be used in planning drilling and/or managing production, through activities such as fluid front monitoring.

To summarize, the Mobile Elevated Transmitter to Borehole Receiver EM method makes use of the newer generation higher moment EM transmitters that can be applied in deep reservoir imaging never before possible. The main advantages of the mobile transmitter platform are the efficient increase in source locations and a drastic reduction in operational time and logistical effort respect to the prior art which required manual installation of many large loop sources on the surface.

Figure 5:
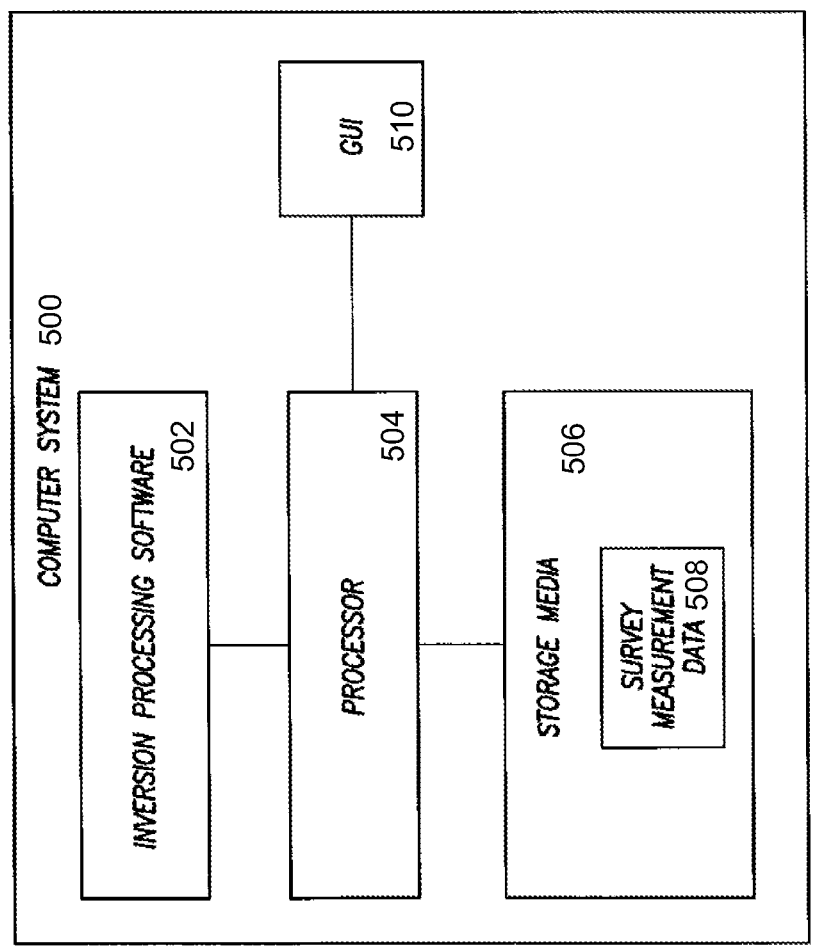
FIG. 5 shows a block diagram of a computer system on which embodiments of the present disclosure may be executed.

FIG. 5 illustrates a computer system 500 that can be used to perform tasks according to an embodiment. The computer system 500 includes inversion processing software 502 that is executable on a processor 504. The processor 504 is connected to storage media 506, which stores survey measurement data 508 that had been received from the various receivers. The storage media 506 can be implemented with one or more disk-based storage devices or integrated circuit (IC) storage devices. The computer system further includes a graphical user interface (GUI) 510 on which a graphical representation of the survey inversion can be output and represented in 2D, 3D, and even 4D.

Instructions of software to carry out processing and inversion described above are loaded for execution on a processor (such as processor 500 in FIG. 5). The processor includes microprocessors, microcontrollers, processor modules or subsystems (including one or more microprocessors or microcontrollers), or other control or computing devices. A "processor" can refer to a single component or to plural components (e.g., one or multiple central processing units in one or more computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method to determine a property of an earth formation, comprising:
   providing a mobile electromagnetic (EM) transmitter comprising a multi-turn coil of wire disposed at one or more predetermined elevated heights above a surface of the earth and not in contact with the surface of the earth;
   providing one or more receivers moveably disposed in a wellbore penetrating the earth formation;
   transmitting electromagnetic energy from the mobile transmitter into the formation from a plurality of locations by moving the mobile transmitter in a spiral pattern;
   receiving a signal from the formation with the one or more receivers;
   wherein the spiral pattern the mobile transmitter is moved in is spiral with respect to the one or more receivers;
   using the signal received by the one or more receivers to determine the property of the formation.

2. The method of claim 1, comprising:
   providing a plurality of receivers located on or near the earth's surface and configured in an array; and
   using the signal received by the one or more receivers in the wellbore and the plurality receivers on or near the earth's surface to determine the property of the formation.

3. The method of claim 1, wherein the property is resistivity.

4. The method of claim 1, wherein the mobile transmitter disposed at the one or more predetermined elevated heights above the surface of the earth is affixed to a moveable surface vehicle.

5. The method of claim 4, wherein the moveable surface vehicle comprises a boat, a truck, tractor, or automobile, or railcar.

6. The method of claim 1, wherein the transmitter disposed at the one or more predetermined elevated heights above the surface of the earth is towed by a moveable airborne vehicle.

7. The method of claim 1, wherein the one or more receivers comprise electrode sensors, electric field sensors, magnetic field sensors, seismic sensors, or a combination of those sensors.

8. The method of claim 1, wherein the one or more receivers are sensitive to electromagnetic energy and/or seismic energy.

9. The method of claim 2, comprising:
   providing one or more additional receivers disposed at a predetermined elevated height above a surface of the earth formation; and
   using the signal received by the one or more receivers in the wellbore, the receivers disposed at a predetermined elevated height, and the receivers on or near the earth's surface to determine the property of the formation.

10. The method of claim 1, wherein the one or more predetermined height is in the range of one to five hundred meters.

11. A system to determine a property of an earth formation, comprising:
    a mobile electromagnetic (EM) transmitter coil disposed at one or more predetermined elevated heights above a surface of the earth and not in contact with the surface of the earth, wherein the mobile transmitter is adapted to transmit electromagnetic energy into the formation and is affixed to a mobile vehicle moving in a spiral pattern;
    a plurality of receivers moveably disposed in a wellbore penetrating the earth formation wherein the receivers are each adapted to receive a signal from the formation, wherein the spiral pattern the mobile transmitter is moved in is spiral with respect to the plurality of receivers; and
    a computer means for inverting the signals received by the plurality of receivers to determine the property of the formation.

12. The system of claim 11, comprising:
    a plurality of receivers located on or near the earth's surface and configured in an array;
    wherein the computer means for inverting the signals is adapted to use the signals received by the plurality of receivers on or near the earth's surface with the signals received by the plurality of receivers disposed in the wellbore to determine the property of the formation.

13. The system of claim 12, comprising:
    a plurality of additional receivers disposed at a predetermined elevated height above a surface of the earth formation; and
    wherein the computer means for inverting the signals is adapted to use the signals received by the one or more receivers in the wellbore, the receivers disposed at the predetermined elevated height, and the receivers on or near the earth's surface to determine the property of the formation.

14. The system of claim 11, comprising a clock means for synchronizing the receivers and transmitter.

15. A method for reservoir evaluation using mobile transmitters with in-borehole measurements, comprising:

positioning an electromagnetic (EM) transmitter elevated above the Earth's surface and not in contact with the Earth's surface;

broadcasting an EM signal through the Earth;

providing an array of downhole electromagnetic receivers in a wellbore;

measuring the EM signal broadcast through the earth at each of the downhole electromagnetic receivers;

moving the transmitter to a number of locations in a spiral pattern with respect to the array of downhole electromagnetic receivers;

repeating the step of measuring the EM signal broadcast through the earth at each of the downhole electromagnetic receivers; and imaging the formation resistivity of an area about the wellbore from measurements taken by the electromagnetic receivers of the EM signal.

16. The method of claim 1, wherein transmitting electromagnetic energy from the mobile transmitter into the formation from the plurality of locations comprises transmitting the electromagnetic energy from the mobile transmitter into the formation at a plurality of different heights above the surface.

17. The system of claim 11, wherein the mobile transmitter is adapted to transmit electromagnetic energy into the formation at a plurality of different heights above the surface.

18. The method of claim 15, wherein the EM signal is broadcast at a plurality of different heights above the surface.

* * * * *